US012686271B2

(12) United States Patent
Tsujino et al.

(10) Patent No.: US 12,686,271 B2
(45) Date of Patent: Jul. 21, 2026

(54) DISPLAY CONTROL DEVICE, DISPLAY CONTROL METHOD, AND COMPUTER-READABLE STORAGE MEDIUM

(71) Applicant: TOYOTA JIDOSHA KABUSHIKI KAISHA, Toyota (JP)

(72) Inventors: Miki Tsujino, Nagakute (JP); Takahiro Mizuno, Nagoya (JP); Yuhei Oya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/054,290

(22) Filed: Feb. 14, 2025

(65) Prior Publication Data

US 2025/0282219 A1 Sep. 11, 2025

(30) Foreign Application Priority Data

Mar. 7, 2024 (JP) ................................. 2024-035385

(51) Int. Cl.
B60K 35/234 (2024.01)
B60K 35/81 (2024.01)
(52) U.S. Cl.
CPC ............ B60K 35/234 (2024.01); B60K 35/81 (2024.01); *B60K 2360/48* (2024.01)

(58) Field of Classification Search
CPC ..................................................... B60W 50/14
See application file for complete search history.

(56) References Cited

U.S. PATENT DOCUMENTS

| | | | |
|---|---|---|---|
| 2016/0001780 A1* | 1/2016 | Lee ........................... | B60R 1/31 |
| | | | 348/46 |
| 2016/0231746 A1* | 8/2016 | Hazelton .............. | G05D 1/0274 |
| 2016/0272199 A1* | 9/2016 | Kawahara ............... | B60T 8/172 |
| 2018/0099676 A1* | 4/2018 | Goto ..................... | B60W 30/10 |
| 2019/0333481 A1* | 10/2019 | Hato ...................... | B60K 35/81 |
| 2022/0063404 A1 | 3/2022 | Takabatake et al. | |
| 2023/0236037 A1* | 7/2023 | Heilbron .............. | G08G 1/0133 |
| | | | 701/422 |
| 2024/0010122 A1* | 1/2024 | Nagata ................... | B60Q 1/444 |

FOREIGN PATENT DOCUMENTS

JP         2022-41285 A       3/2022

* cited by examiner

*Primary Examiner* — Nan-Ying Yang
(74) *Attorney, Agent, or Firm* — Oblon, McClelland, Maier & Neustadt, L.L.P.

(57) ABSTRACT

A display control device performs control to display states of a vicinity of a vehicle at a display device. In performing the control to display, the display control device causes states of the vicinity of the vehicle to differ in accordance with respective operation states of plural driving assistance functions.

13 Claims, 15 Drawing Sheets

```
                                    10
   ┌─────────────────────────────┐
   │                             │
   │   ┌─────────────────────┐   │
   │   │    ACQUISITION      │───┼── 60
   │   │     SECTION         │   │
   │   └─────────────────────┘   │
   │                             │
   │   ┌─────────────────────┐   │
   │   │    DETECTION        │───┼── 62
   │   │     SECTION         │   │
   │   └─────────────────────┘   │
   │                             │
   │   ┌─────────────────────┐   │
   │   │ DISPLAY CONTROL     │───┼── 64
   │   │     SECTION         │   │
   │   └─────────────────────┘   │
   │                             │
   └─────────────────────────────┘
```

DISPLAY CONTROL DEVICE, DISPLAY CONTROL METHOD, AND COMPUTER-READABLE STORAGE MEDIUM

CROSS-REFERENCE TO RELATED APPLICATION

This application is based on and claims priority under 35 USC § 119 from Japanese Patent Application No. 2024-035385 filed on Mar. 7, 2024, the disclosure of which is incorporated by reference herein.

TECHNICAL FIELD

The present disclosure relates to a display control device, a display control method and a computer-readable storage medium storing a display control program.

RELATED ART

Patent Reference 1 (Japanese Patent Application Laid-Open (JP-A) No. 2022-014285) discloses a technology that, when a driving mode of a vehicle is an autonomous driving mode and an interruption that is a driving operation by an occupant is detected, changes and displays background information of vicinity information of the vehicle.

Recently, a vehicle may be equipped with plural driving assistance functions that assist driving of the vehicle. In a vehicle equipped with plural driving assistance functions, it is preferable that an occupant may easily ascertain operation states of the plural driving assistance functions. With the technology recited in Patent Reference 1, when a driving mode of a vehicle is an autonomous driving mode, an occupant may ascertain that an interruption by a driving operation by the occupant has been detected. However, there is scope for improvement in regard to ascertaining operation states of driving assistance functions.

The present disclosure is made in consideration of the circumstances described above. An object of the present disclosure is to provide a display control device, a display control method and a computer-readable medium storing a display control program that may enable an occupant of a vehicle to easily ascertain operation states of plural driving assistance functions embedded in the vehicle.

SUMMARY

A display control device according to a first aspect is a display control device for performing control to display states of a vicinity of a vehicle at a display device. The display control device includes a display control section that performs the control to display with a display mode of a state of the vicinity of the vehicle differing in accordance with respective operation states of plural driving assistance functions.

According to the display control device of the first aspect, display is performed with display modes of states of the vicinity of the vehicle differing in accordance with respective operation states of the plural driving assistance functions. Thus, an occupant of the vehicle may easily ascertain operation states of the plural driving assistance functions embedded in the vehicle.

In a display control device according to a second aspect, in the display control device of the first aspect, the state of the vicinity of the vehicle whose display mode is caused to differ by the display control section includes at least one of an image of a road surface of a traffic lane along which the vehicle is running and an image of a boundary line of the traffic lane.

According to the display control device of the second aspect, as states of the vicinity of the vehicle, display modes differ for at least one of the image of the surface of a traffic lane along which the vehicle is running and the image of a boundary line of the traffic lane. Thus, the occupant of the vehicle more easily ascertains operation states of the plural driving assistance functions embedded in the vehicle.

In a display control device according to a third aspect, in the display control device of the second aspect, the display control section causes the display mode of the image of the road surface to differ in accordance with an operation state of a vehicle following distance control function that maintains an inter-vehicle distance between the vehicle and a preceding vehicle running in front of the vehicle.

According to the display control device of the third aspect, display modes of the image of the road surface differ in accordance with operation states of the vehicle following distance control function. Thus, the occupant of the vehicle may easily ascertain operation states of the vehicle following distance control function.

In a display control device according to a fourth aspect, the display control device of the third aspect further includes a detection section that detects an accelerator operation by an occupant of the vehicle. The display control section changes the display mode of the image of the road surface when an accelerator operation is detected by the detection section during operation of the vehicle following distance control function.

According to the display control device of the fourth aspect, the display mode of the image of the road surface changes when an accelerator operation is detected by the detection section during operation of the vehicle following distance control function. Thus, during operation of the vehicle following distance control function, the occupant of the vehicle may ascertain that the accelerator operation has been performed.

In a display control device according to a fifth aspect, in the display control device of any one of the second to fourth aspects, when a condition designated as a condition causing a warning is satisfied, the display control section performs control to set a color of the image of the road surface to a specific color.

According to the display control device of the fifth aspect, when the condition designated as a condition that causes a warning is satisfied, the color of the image of the road surface is set to the specific color. Thus, the occupant of the vehicle is more likely to be aware of the warning.

In a display control device according to a sixth aspect, in the display control device of any one of the second to fifth aspects, the display mode of the image of the boundary line is caused to differ in accordance with an operation state of a lane centering assist function that assists the vehicle to run along the middle of the traffic lane.

According to the display control device of the sixth aspect, display modes of the image of the boundary line differ in accordance with operation states of the lane centering assist function. Thus, the occupant of the vehicle may easily ascertain operation states of the lane centering assist function.

In a display control device according to a seventh aspect, in the display control device of any one of the second to sixth aspects, a vehicle following distance control function maintains an inter-vehicle distance between the vehicle and a preceding vehicle running in front of the vehicle, a lane centering assist function assists the vehicle to run along the middle of a traffic lane and, when the vehicle following distance control function and the lane centering assist function are operating normally and a condition designated as a condition representing the vehicle being in traffic congestion is satisfied, the display control section changes the display modes of the image of the road surface and the image of the boundary line.

According to the display control device of the seventh aspect, when the vehicle following distance control function and the lane centering assist function are operating normally and the condition designated as a condition that represents being in traffic congestion is satisfied, the display modes of the image of the road surface and the image of the boundary line are changed. Thus, the occupant of the vehicle may easily ascertain that functions that assist running when in traffic congestion are operating.

In a display control method according to an eighth aspect, a computer that performs control to display states of a vicinity of a vehicle at a display device executes processing that includes performing the control to display with a display mode of a state of the vicinity of the vehicle differing in accordance with respective operation states of plural driving assistance functions.

A display control program according to a ninth aspect causes a computer that performs control to display states of a vicinity of a vehicle at a display device to execute processing that includes performing the control to display with a display mode of a state of the vicinity of the vehicle differing in accordance with respective operation states of plural driving assistance functions.

According to the present disclosure, an occupant of a vehicle may easily ascertain operation states of plural driving assistance functions embedded in the vehicle.

BRIEF DESCRIPTION OF DRAWINGS

FIG. 1 is a diagram schematically showing a state of a cabin front portion of a vehicle seen from the vehicle rear side thereof.

FIG. 3 is a block diagram showing an example of functional structures of the display control device.

DETAILED DESCRIPTION

Figure 2:
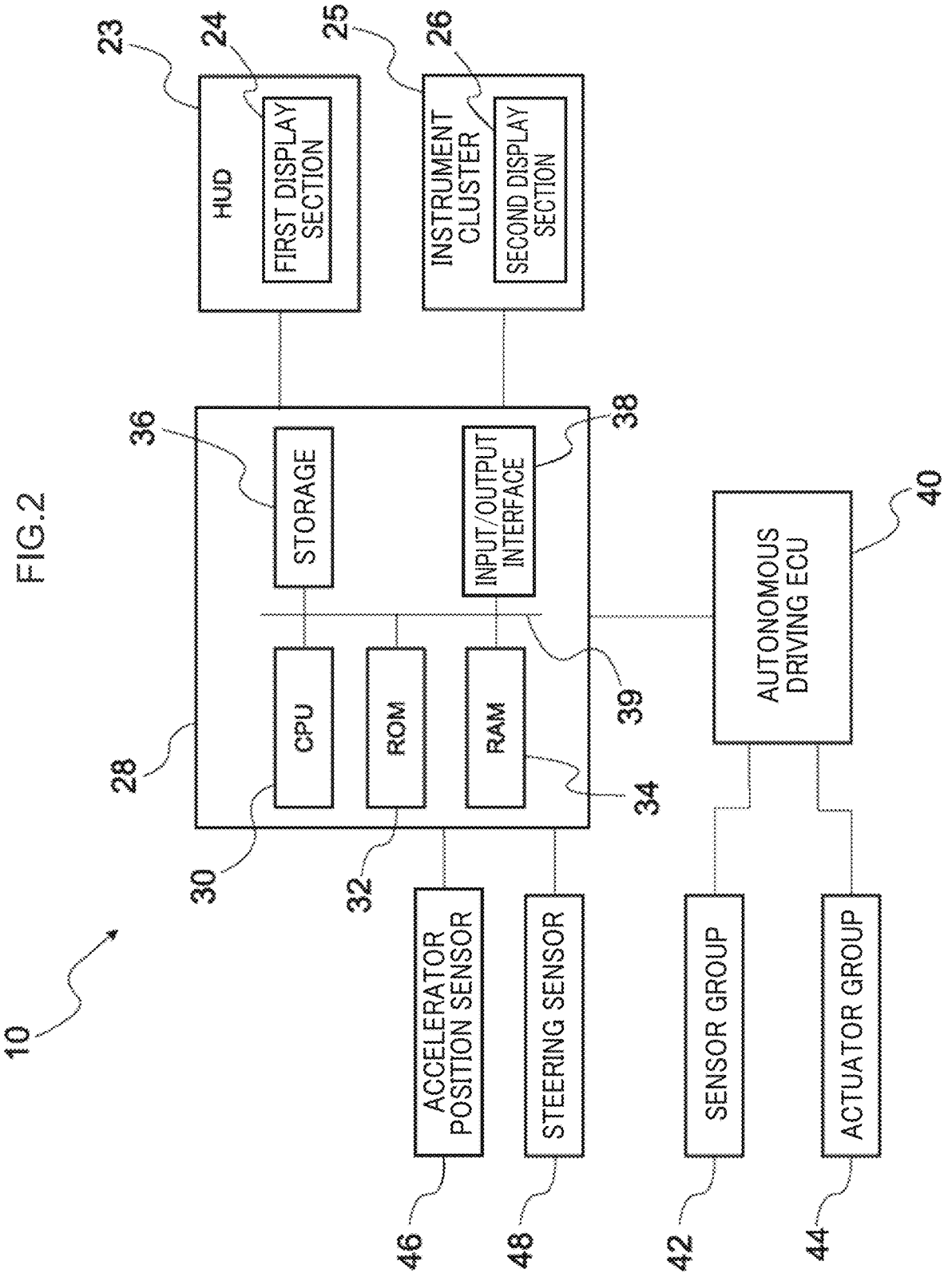
FIG. 2 is a block diagram showing an example of hardware structures of a display control device.

Below, an example of an embodiment for carrying out the present disclosure is described in detail with reference to the drawings.

Figure 1:
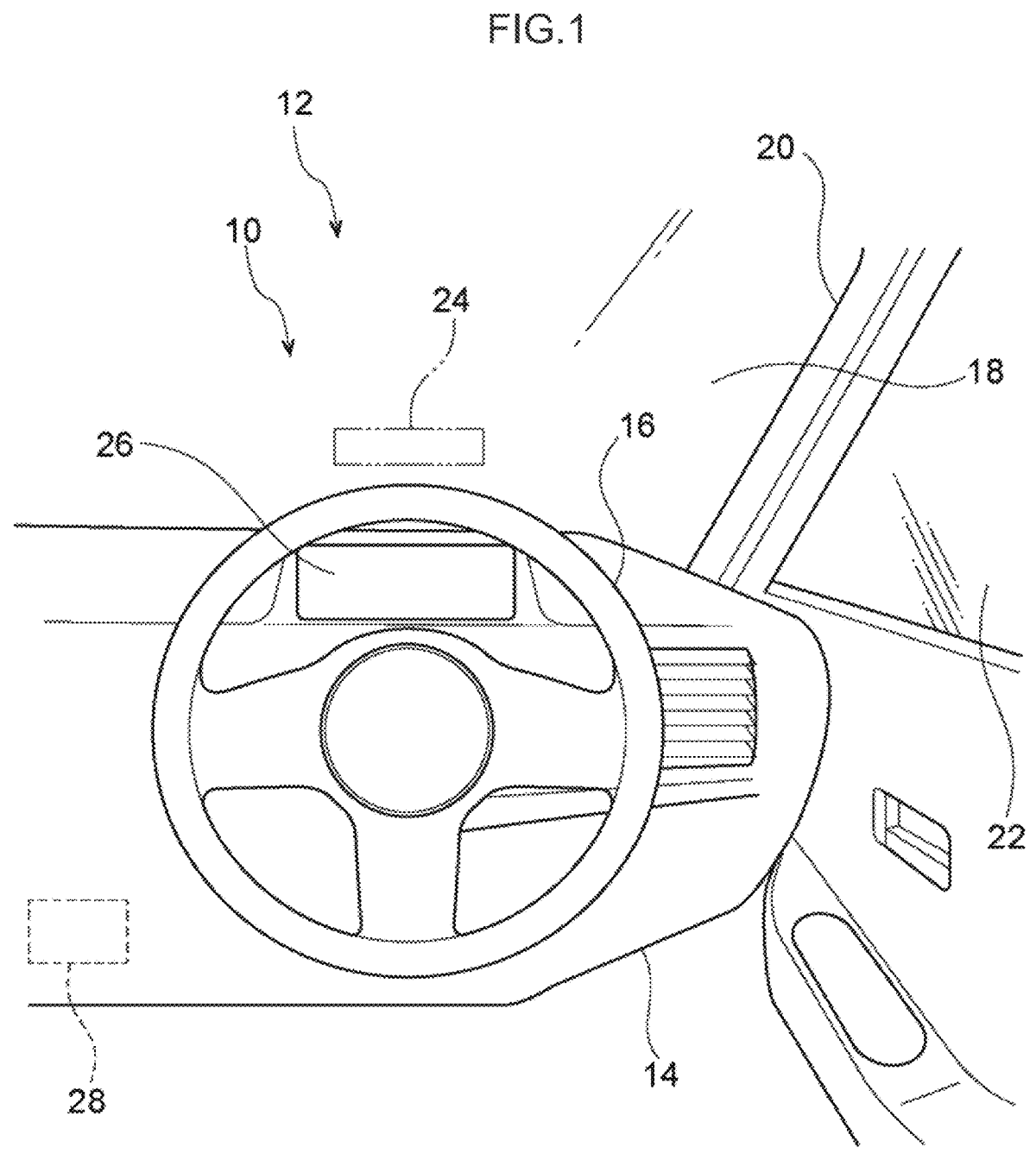

First, structures of a vehicle 12 in which a display control device 10 according to the present exemplary embodiment is employed are described with reference to FIG. 1. As shown in FIG. 1, an instrument panel 14 is provided at a front portion of a cabin interior of a vehicle 12. The instrument panel 14 extends in the vehicle width direction, and a steering wheel 16 is provided at the vehicle right side of the instrument panel 14. That is, the present exemplary embodiment is an example of a right-hand drive car in which the steering wheel 16 is provided at the right side and a driver seat is set at the vehicle right side.

A windshield glass 18 is provided at a front end portion of the instrument panel 14. The windshield glass 18 extends in the vehicle vertical direction and the vehicle width direction, dividing the cabin interior from the cabin exterior.

A vehicle right side end portion of the windshield glass 18 is fixed to a vehicle right side front pillar 20. The front pillar 20 extends in the vehicle vertical direction, and the windshield glass 18 is fixed to a vehicle width direction inner side end portion of the front pillar 20. A front end portion of a front side glass 22 is fixed to a vehicle width direction outer side end portion of the front pillar 20. A vehicle left side end portion of the windshield glass 18 is fixed to a vehicle left side front pillar, which is not shown in the drawings.

A first display section 24 is provided at the windshield glass 18. The first display section 24 is constituted by a projection surface that is projected onto by a head-up display device 23 (see FIG. 2; in FIG. 2, the head-up display is labeled "HUD"). Specifically, the head-up display device 23 is provided at the vehicle front side relative to the instrument panel 14, and the head-up display device 23 is structured to project images onto the first display section 24 of the windshield glass 18.

A second display section 26 is provided at the vehicle lower side relative to the first display section 24. The second display section 26 is a display section that is displayed in an instrument cluster 25 (see FIG. 2). The instrument cluster 25 is disposed at the instrument panel 14 to the vehicle front of the driver seat. The first display section 24 and the second display section 26 are provided at positions that are viewable by a driver. The second display section 26 is an example of a display device relating to the technology of the disclosure.

Now, hardware structures of the display control device 10 are described with reference to FIG. 2. The display control device 10 is a device that performs control to display states of the vicinity of the vehicle at the second display section 26. As shown in FIG. 2, the display control device 10 includes an electronic control unit (ECU) 28. The ECU 28 is an example of a computer.

The ECU 28 includes a central processing unit (CPU) 30, read-only memory (ROM) 32, random access memory (RAM) 34, storage 36 and an input/output interface (I/F) 38. The CPU 30, ROM 32, RAM 34, storage 36 and input/output interface 38 are connected with one another to be capable of communications via an internal bus 39.

The CPU 30 is a central arithmetic processing unit that executes various programs and controls respective parts. That is, the CPU 30 reads a program from the ROM 32 or the storage 36, and executes the program using the RAM 34 as a workspace. The CPU 30 performs control of the structures described above and various kinds of computational processing in accordance with programs recorded in the ROM 32 or the storage 36.

The ROM 32 stores various programs and various kinds of data. The RAM 34 serves as a workspace, temporarily memorizing programs and data. The storage 36 is structured by a hard disk drive (HDD), a solid state drive (SDD) or flash memory. The storage 36 is a non-transitory recording medium that stores various programs, including an operating system, and various kinds of data. In the present exemplary embodiment, the ROM 32 or the storage 36 stores a display control program for implementing display control processing and the like. Various input/output devices are connected to the input/output interface 38.

The ECU 28 is electronically connected to an autonomous driving ECU 40. Similarly to the ECU 28, the autonomous driving ECU 40 includes a CPU, ROM, RAM, storage and an input output interface, which are not shown in the drawings.

A sensor group 42 and an actuator group 44 are connected to the autonomous driving ECU 40. The sensor group 42 detects current states of the vehicle 12. The actuator group 44 controls running of the vehicle 12. The sensor group 42 includes various sensors, such as cameras, radar, lidar (light detection and ranging/laser imaging detection and ranging), a GPS (global positioning system) sensor and so forth. The cameras image the vicinity of the vehicle 12. The radar detects distances and directions of objects in the vicinity of the vehicle 12 with electromagnetic waves. The lidar detects distances and directions of objects in the vicinity of the vehicle 12 with laser light. The GPS sensor detects a current location of the vehicle 12. In addition, the sensor group 42 may include sensors that detect states of vehicle occupants. For example, the sensor group 42 may include biosensors that detect pulse rates, levels of alertness and the like of vehicle occupants.

The actuator group 44 includes acceleration and braking actuators that regulate acceleration and deceleration of the vehicle 12, and a steering actuator that drives a steering apparatus of the vehicle 12. The autonomous driving ECU 40 implements autonomous driving of the vehicle 12 by controlling operations of the actuator group 44 in accordance with current states of the vehicle 12 detected by the sensor group 42. A planned route representing a route along which the vehicle 12 plans to run is memorized in a memory section of the autonomous driving ECU 40. The autonomous driving ECU 40 causes the vehicle 12 to run along the planned route memorized in the memory section.

The ECU 28 is connected to an accelerator position sensor 46 and a steering sensor 48. The accelerator position sensor 46 is a sensor that detects positions of an accelerator pedal, which is not shown in the drawings, that is provided at a lower portion of the driver seat. The steering sensor 48 is a sensor that detects loads applied to the steering wheel 16 by a vehicle occupant.

The vehicle 12 according to the present exemplary embodiment is equipped with plural driving assistance functions. In the present exemplary embodiment, an example is described in which the driving assistance functions that are employed are a vehicle following distance control function, a lane centering assist function and a traffic jam assist function. The vehicle following distance control function maintains an inter-vehicle distance from a preceding vehicle that is running in front of the vehicle 12 such that the inter-vehicle distance is a specified distance. The lane centering assist function assists running of the vehicle 12 in the middle of a traffic lane. The traffic jam assist function assists running of the vehicle 12 when in traffic congestion. The vehicle following distance control function and lane centering assist function according to the present exemplary embodiment may be switched on and off by buttons provided at the vehicle right side of the instrument panel 14, the steering wheel 16 or the like.

These driving assistance functions are implemented by the autonomous driving ECU 40. In the present exemplary embodiment, when respective operation states of the plural driving assistance functions change, the autonomous driving ECU 40 outputs the operation states of the driving assistance functions to the ECU 28. The ECU 28 controls displays to enable recognition of the respective operation states of the plural driving assistance functions.

Figure 3:
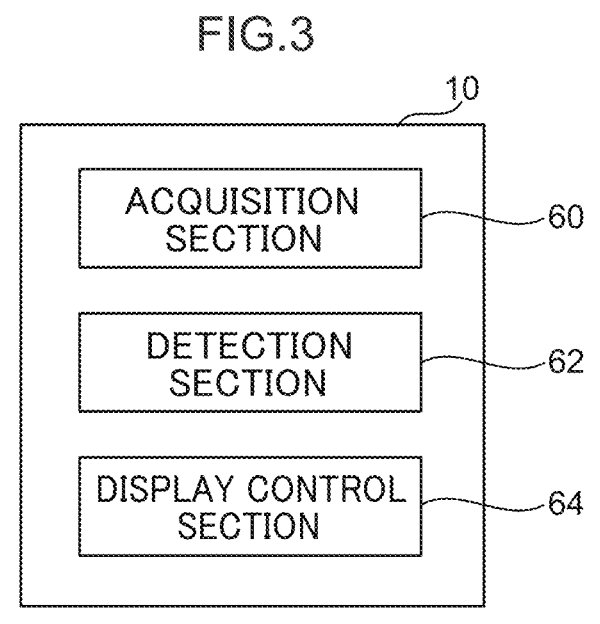

Functional structures of the display control device 10 according to the present exemplary embodiment are described with reference to FIG. 3. As shown in FIG. 3, the display control device 10 includes an acquisition section 60, a detection section 62 and a display control section 64. By executing a program memorized at the ROM 32 or the storage 36, the CPU 30 functions as the acquisition section 60, the detection section 62 and the display control section 64.

The acquisition section 60 acquires an operation state of a driving assistance function outputted from the autonomous driving ECU 40. The detection section 62 detects an accelerator operation by an occupant of the vehicle 12. In the present exemplary embodiment, the detection section 62 detects an accelerator operation by the occupant of the vehicle 12 by detecting when an accelerator pedal moves from an initial position thereof on the basis of signals from the accelerator position sensor 46.

The display control section 64 controls displays at the second display section 26, with display modes of states of the vicinity of the vehicle 12 differing in accordance with respective operation states of the plural driving assistance functions. In the present exemplary embodiment, as the states of the vicinity of the vehicle 12, the display control section 64 causes display modes to differ for at least one of an image of a road surface of a traffic lane along which the vehicle 12 is running (below referred to as a running lane) and images of boundary lines of the running lane. The operation states referred to herein include an off state in which a function is turned off by a button and on states in which the function is turned on by a button. The on states referred to herein include at least one of a first operation state in which the function is operating normally, a second operation state in which the function is not operating normally, and a third operation state that is a state in which the function is operating normally but an alert is being given to the occupant of the vehicle 12. The display control section 64 controls displays to enable recognition of whether an operation state of each driving assistance function is the off state (that is, a non-operational state), the first operation state, the second operation state or the third operation state, by performing control to display differing display modes of the image of the surface of the running lane and the images of the boundary lines of the running lane.

Specific examples of screens that are displayed at the second display section 26 under control by the display control section 64 are described with reference to FIG. 4 to FIG. 10.

Figure 4:
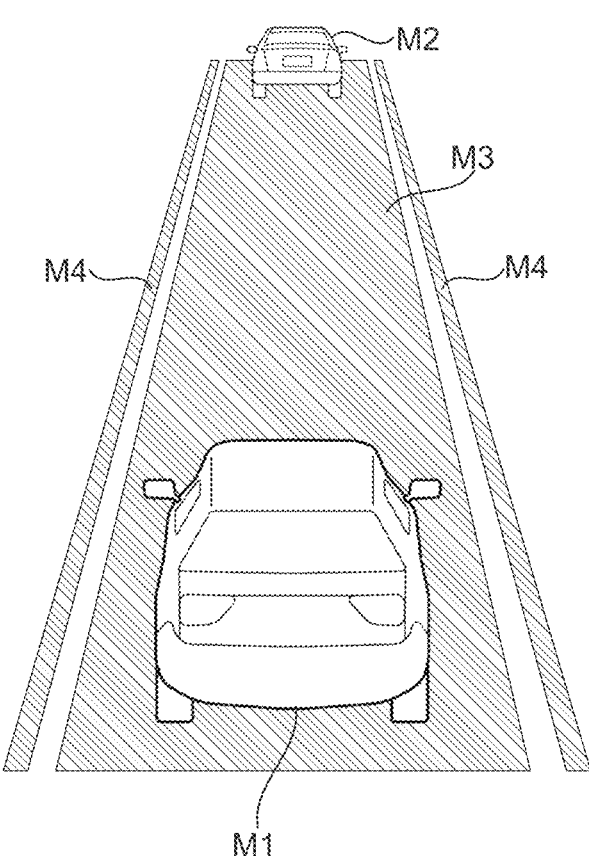
FIG. 4 is a view showing an example of a display screen.

FIG. 4 shows an example of a display screen when the vehicle following distance control function and the lane centering assist function are both in the first operation state. As shown in FIG. 4, in the present exemplary embodiment a host vehicle image M1, a preceding vehicle image M2, a road surface image M3 and boundary line images M4 are displayed at the second display section 26. The host vehicle image M1 portrays the host vehicle that is the vehicle 12. The preceding vehicle image M2 portrays a preceding vehicle running in front of the vehicle 12. The road surface image M3 portrays the surface of a running lane. The boundary line images M4 portray boundary lines at the left and right of the running lane.

The road surface image M3 is displayed in a strip shape from a lower area to an upper area at the middle in the left-and-right direction of the second display section 26. The road surface image M3 is displayed so as to gradually narrow in width from the lower area to the upper area of the second display section 26. The boundary line images M4 are displayed respectively to left and right of the road surface image M3. The boundary line images M4 are displayed in strip shapes from the lower area to the upper area of the second display section 26. The boundary line images M4 are also displayed so as to gradually narrow in width from the lower area to the upper area of the second display section 26. Widths of the boundary line images M4 are narrower than the widths of the road surface image M3. The host vehicle image M1 is displayed superimposed on the road surface image M3 in the lower area of the second display section 26. The preceding vehicle image M2 is displayed superimposed on the road surface image M3 at a position in an upper area relative to the host vehicle image M1, which is a position corresponding with an inter-vehicle distance between the vehicle 12 and the preceding vehicle.

When the vehicle following distance control function and the lane centering assist function are both in the first operation state, the display control section 64 controls the display to fill in the road surface image M3 and the boundary line images M4 with a first color (for example, green).

Figure 5:
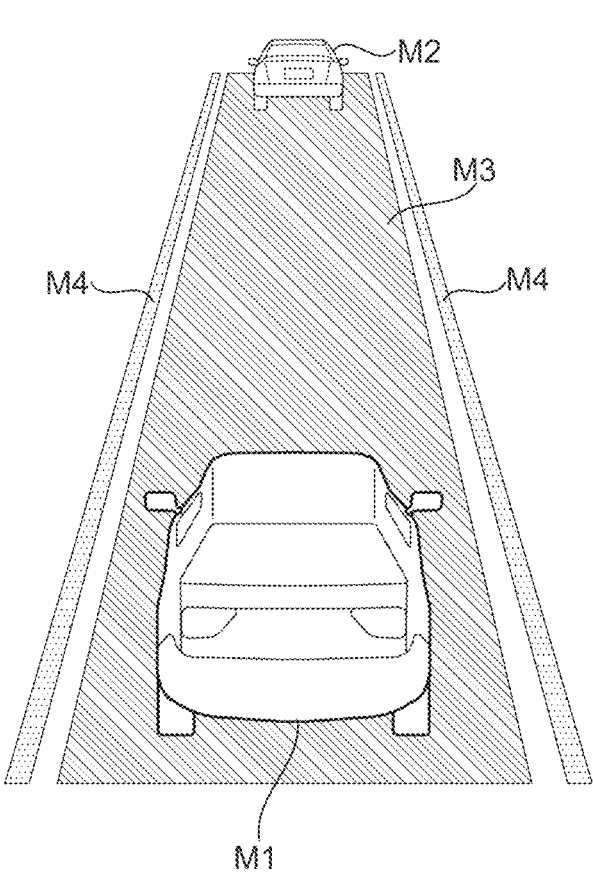
FIG. 5 is a view showing an example of a display screen.

FIG. 5 shows an example of a display screen when the vehicle following distance control function is in the first operation state and the lane centering assist function is in the second operation state. For example, the lane centering assist function being in the second operation state may mean a state in which the autonomous driving ECU 40 cannot identify boundary lines of the running lane and although the lane centering assist function is in the on state, the function is not working normally. A further example of the lane centering assistance function being in the second operation state is a state in which the lane centering assist function is in the on state but has temporarily stopped due to an occupant of the vehicle 12 operating the steering wheel 16. When the vehicle following distance control function is in the first operation state and the lane centering assist function is in the second operation state, the display control section 64 controls the display to fill in the road surface image M3 with the first color and fill in the boundary line images M4 with a second color (for example, gray).

Figure 6:
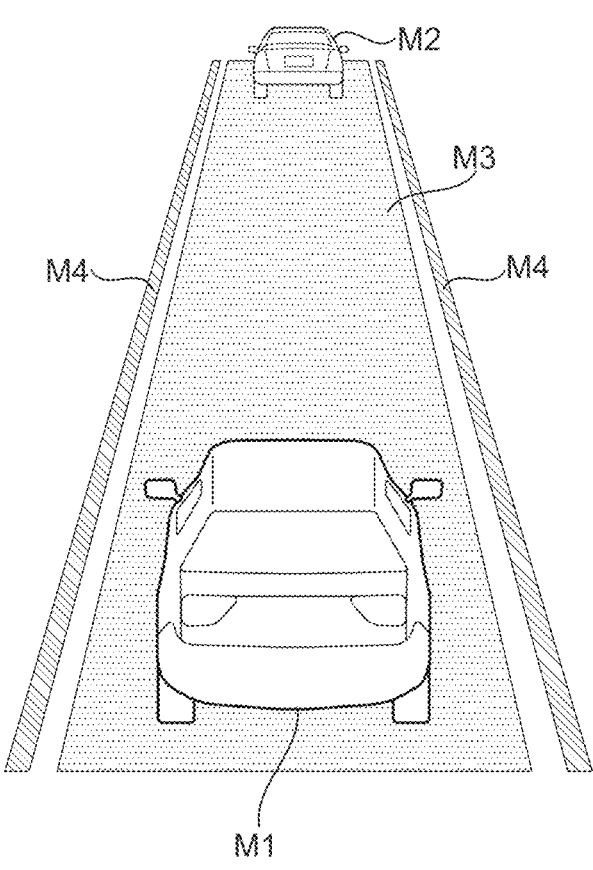
FIG. 6 is a view showing an example of a display screen.

FIG. 6 shows an example of a display screen when the vehicle following distance control function switches to the second operation state from the state shown in FIG. 4. For example, when an accelerator operation is detected by the detection section 62 while the vehicle following distance control function is in the first operation state, the vehicle following distance control function temporarily stops, that is, goes into the second operation state in which the vehicle following distance control function is not operating normally. At this time, the display control section 64 controls the display to fill in the road surface image M3 with a third color (for example, silver). In the example in FIG. 6, because the lane centering assist function is in the first operation state, the boundary line images M4 are filled in with the first color. That is, when an accelerator operation is detected by the detection section 62 while the vehicle following distance control function is operating, the display control section 64 changes a display mode of the image of the surface of the running lane.

Figure 7:
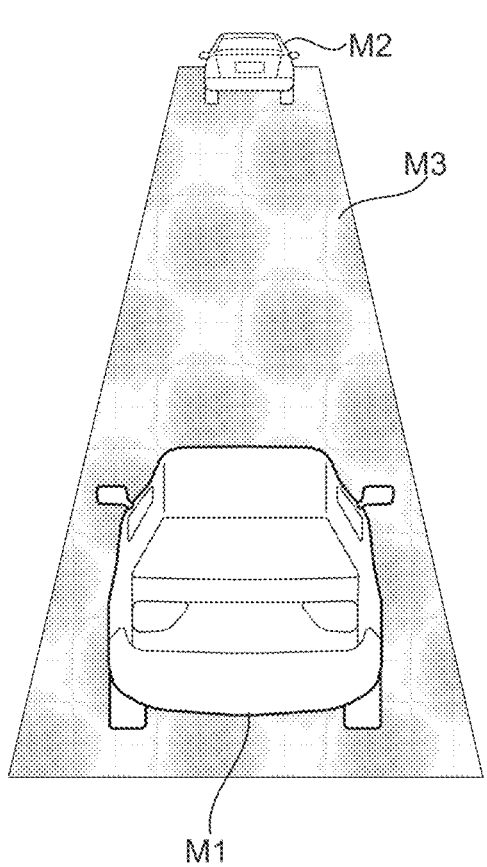
FIG. 7 is a view showing an example of a display screen.

FIG. 7 shows an example of a display screen when the vehicle following distance control function and the lane centering assist function are both in the off state. In this situation, the display control section 64 controls the display to fill in the road surface image M3 with the second color and to not display the boundary line images M4.

Figure 8:
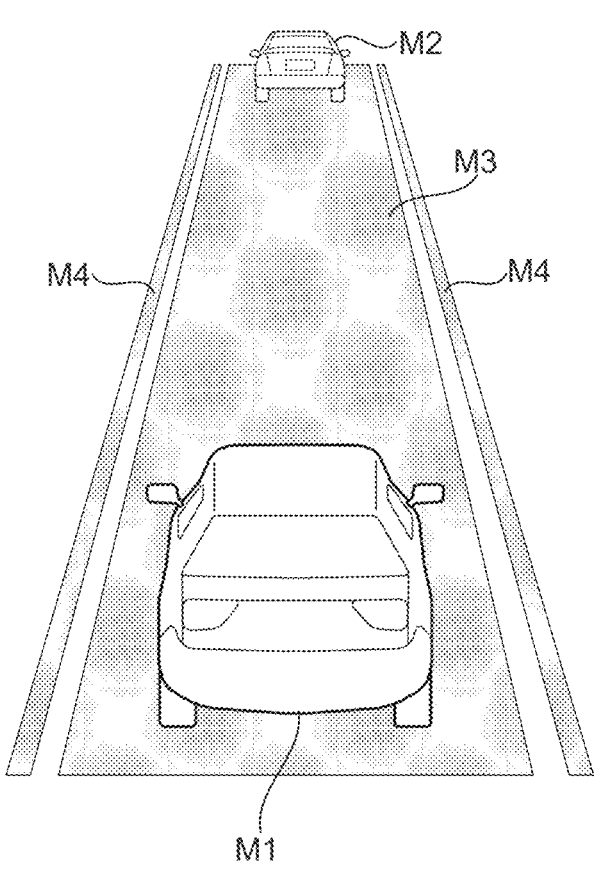
FIG. 8 is a view showing an example of a display screen.

FIG. 8 shows an example of a display screen when the vehicle following distance control function is in the off state and the lane centering assist function is in the second operation state. In this situation, the display control section 64 controls the display to fill in the road surface image M3 and the boundary line images M4 with the second color. Note that when the vehicle following distance control function is in the off state and the lane centering assist function is in the first operation state, the display control section 64 controls the display to fill in the road surface image M3 with the second color and fill in the boundary line images M4 with the first color.

Figure 9:
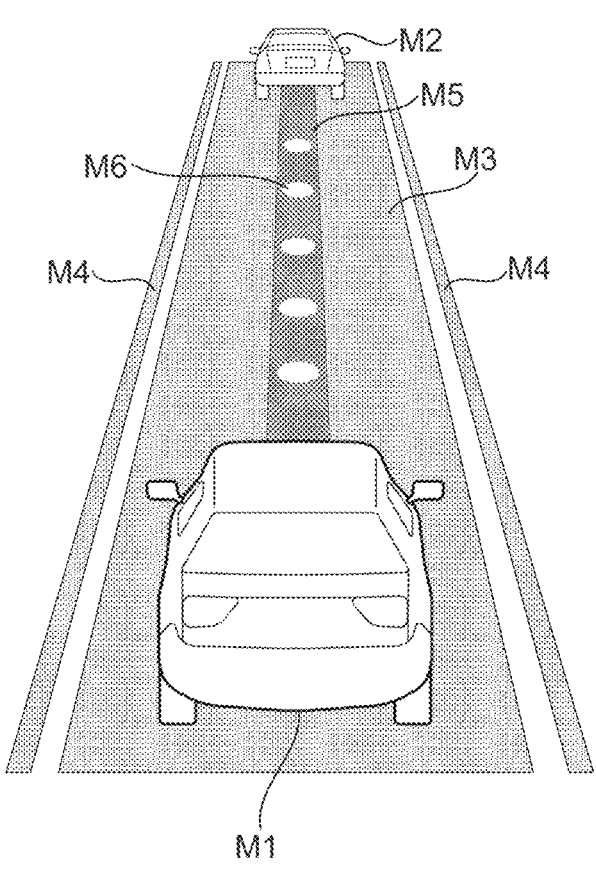
FIG. 9 is a view showing an example of a display screen.

FIG. 9 shows an example of a display screen when the traffic jam assist function is in the first operation state. In the vehicle 12 according to the present exemplary embodiment, when the vehicle following distance control function and the lane centering assist function are in the first operation state, that is, are operating normally and a condition designated as a condition that represents being in traffic congestion is satisfied, the traffic jam assist function goes into the first operation state thereof. As examples of this condition, a condition of the speed of the vehicle 12 being below a certain speed and a condition of the eyeline of an occupant sitting in a driver seat of the vehicle 12 being directed forward can be mentioned. When the traffic jam assist function is in the first operation state, it is permitted for the occupant sitting on the driver seat of the vehicle 12 to remove their hands from the steering wheel 16, that is, to go into a hands-off state.

When the traffic jam assist function is in the first operation state, the display control section 64 controls the display to fill in the road surface image M3 and the boundary line images M4 with a fourth color (for example, blue). In other words, when the condition designated as a condition representing being in traffic congestion is satisfied while the vehicle following distance control function and the lane centering assist function are operating normally, the display control section 64 changes display modes of the image of the surface of the running lane and the images of the boundary lines of the running lane. When the traffic jam assist function is in the first operation state, the display control section 64 controls the display to show a trajectory image M5 portraying an expected running route of the vehicle 12 and speed marks M6 corresponding to the speed of the vehicle 12. The trajectory image M5 is displayed superimposed on the road surface image M3. The trajectory image M5 is displayed in a strip shape toward the preceding vehicle image M2 from the host vehicle image M1. The trajectory image M5 is displayed with narrower width than the widths of the road surface image M3. The speed marks M6 are displayed in elliptical shapes with major axis widths narrower than the width of the trajectory image M5. The speed marks M6 are plurally displayed superimposed on the trajectory image M5, spaced apart along the vertical direction of the second display section 26. FIG. 9 shows an example in which five of the speed marks M6 are displayed. The speed marks M6 are displayed such that spacings between the neighboring speed marks M6 vary in accordance with the speed of the vehicle 12. More specifically, the slower the speed of the vehicle 12, the more closely spaced the neighboring speed marks M6 are displayed.

If the lane centering assist function changes to the second operation state while the traffic jam assist function is in the first operation state, the display control section 64 controls the display to fill in the road surface image M3 with the fourth color and to fill in the boundary line images M4 with the second color. Further, if the vehicle following distance control function changes to the second operation state while the traffic jam assist function is in the first operation state, the display control section 64 controls the display to fill in the road surface image M3 with the third color and to fill in the boundary line images M4 with the fourth color.

Figure 10:
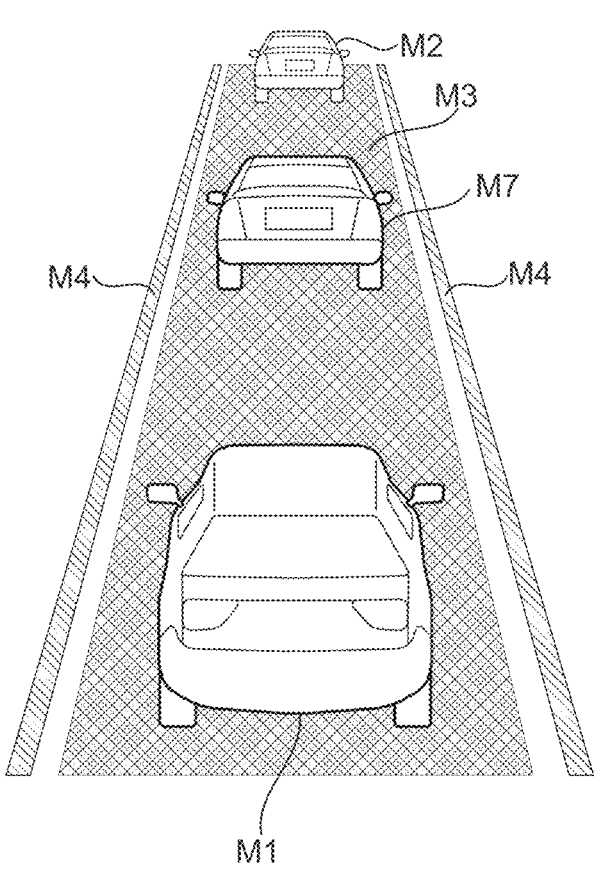
FIG. 10 is a view showing an example of a display screen.

FIG. 10 shows an example of a display screen when the vehicle following distance control function and the lane centering assist function are both in the first operation state and a condition designated as a condition for giving a warning is satisfied. As an example of the condition designated as a condition for giving a warning, a condition of a new preceding vehicle cutting in between the vehicle 12 and a preceding vehicle and consequently an inter-vehicle distance between the vehicle 12 and the other vehicle that has cut in front being below a threshold value can be mentioned. In FIG. 10, the reference symbol M7 indicates a preceding vehicle image portraying a new preceding vehicle that has cut in between the vehicle 12 and the preceding vehicle corresponding with the preceding vehicle image M2. The state shown in FIG. 10 signifies that the operation state of the vehicle following distance control function has changed from the first operation state to the third operation state due to the above-described condition being satisfied. In this situation, the display control section 64 controls the display to fill in the road surface image M3 with a specific color (for example, amber) and to fill in the boundary line images M4 with the first color. That is, when the vehicle following distance control function is operating normally and the condition designated as a condition for giving a warning is satisfied, the display control section 64 controls the display to set the color of the image of the surface of the running lane to the specific color. This specific color is a different color from the first to fourth colors. As examples of conditions designated as a condition for giving a warning, a condition of an object falling in front of the vehicle 12 and a condition of a pedestrian or bicycle suddenly emerging in front of the vehicle 12 can also be mentioned. As a further example of a condition designated as a condition for giving a warning, a condition of the vehicle 12 changing lane and consequently an inter-vehicle distance between the vehicle 12 and a new preceding vehicle being below a threshold value can be mentioned.

When a condition designated as a condition for giving a warning is satisfied while the lane centering assist function is operating normally, the display control section 64 may control the display to set the color of the images of boundary lines of the running lane to a specific color. This situation signifies that the operation state of the lane centering assist function has changed from the first operation state to the third operation state due to the above-mentioned condition being satisfied. For example, the display control section 64 controls the display to fill in the boundary line images M4 with the specific color in this situation. As an example of this condition that is designated as a condition for giving a warning, a condition of an occupant sitting on the driver seat of the vehicle 12 removing their hands from the steering wheel 16 for at least a certain duration while the lane centering assist function is in the first operation state can be mentioned.

As described above, the display control section 64 causes display modes of the image of the surface of the running lane to differ in accordance with operation states of the vehicle following distance control function. The display control section 64 also causes display modes of the images of the boundary lines of the running lane to differ in accordance with operation states of the lane centering assist function.

Now, operation of the display control device 10 according to the present exemplary embodiment is described with reference to FIG. 11. The CPU 30 realizes the display control processing shown in FIG. 11 by executing a program memorized at the ROM 32 or storage 36.

Figure 11:
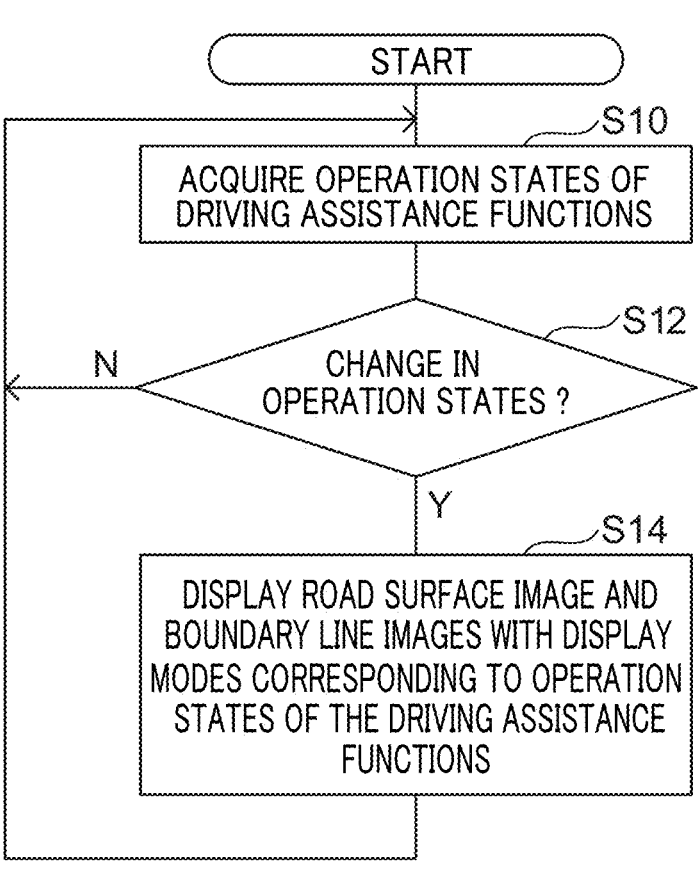
FIG. 11 is a flowchart showing an example of display control processing.

In step S10 of FIG. 11, the acquisition section 60 acquires operation states of driving assistance functions outputted from the autonomous driving ECU 40. In step S12, the display control section 64 makes a determination as to whether there has been a change in the operation states of the driving assistance functions. When the result of this determination is negative, the processing returns to step S10. That is, in this situation the display control section 64 does not change the colors of the road surface image M3 and boundary line images M4 displayed at the second display section 26.

When the result of the determination in step S12 is affirmative, the processing advances to step S14. In step S14, as described above, the display control section 64 performs control to display the road surface image M3 and boundary line images M4 with display modes corresponding to the respective operation states of the plural driving assistance functions. When the processing of step S14 is complete, the processing returns to step S10.

According to the present exemplary embodiment, as described above, an occupant of the vehicle 12 may recognize operation states of the plural driving assistance functions by looking at a single screen. Therefore, according to the present exemplary embodiment, the occupant of the vehicle 12 may easily ascertain operation states of the plural driving assistance functions embedded in the vehicle 12.

In the exemplary embodiment described above, a mode is described in which the display control section 64 performs control to display states of the vicinity of the vehicle 12 at the second display section 26, but the disclosed technology is not limited to this mode. The display control section 64 may perform control to display states of the vicinity of the vehicle 12 at the first display section 24, and may perform control to display states of the vicinity of the vehicle 12 at the first display section 24 and the second display section 26.

In the exemplary embodiment described above, a mode is described in which, as the states of the vicinity of the vehicle 12, the display control section 64 causes differing display modes of the image of the surface of a running lane and the images of boundary lines of the running lane, but the disclosed technology is not limited to this mode. For example, as the states of the vicinity of the vehicle 12, the display control section 64 may cause differing display modes of at least one of the image of the surface of the running lane, the images of boundary lines of the running lane, an image of a background excluding the running lane and boundary lines, and the image of a preceding vehicle.

In the exemplary embodiment described above, a mode is described in which, as the display modes, the display control section 64 causes colors of the image of the surface of the running lane and colors of the images of the boundary lines of the running lane to differ, but the disclosed technology is not limited to this mode. As display modes, the display control section 64 may cause differing hatching of the image of the surface of the running lane and hatching of the images of the boundary lines of the running lane. Further, as display modes the display control section 64 may cause differing color densities of the image of the surface of the running lane and color densities of the images of the boundary lines of the running lane. As display modes, the display control section 64 may cause differing thicknesses of a line outlining the image of the surface of the running lane and thicknesses of lines outlining the images of the boundary lines of the running lane. As display modes, the display control section 64 may cause differing types of the line outlining the image of the surface of the running lane and types of the lines outlining the images of the boundary lines of the running lane.

In the exemplary embodiment described above, a lane departure prevention function that prevents the vehicle 12 leaving the running lane may be employed as a driving assistance function. FIG. 12 to FIG. 15 show examples of display screens when the lane departure prevention function is in a first operation state and a condition designated as a condition in which the lane departure prevention function generates a warning is satisfied. In this situation, the display control section 64 controls the display to fill in a warning image M8 with a specific color. The warning image M8 is at, of the left and right boundary lines of the running lane, a boundary line that the lane departure prevention function is giving a warning about. The warning image M8 is at the opposite side of this boundary line from the running lane. The warning image M8 is displayed in a strip shape from a lower area to the vertical direction middle of the second display section 26. The warning image M8 is displayed with a width that is wider than the boundary line images M4 but narrower than the road surface image M3. As a condition designated as a condition in which the lane departure prevention function generates a warning, a condition of the vehicle 12 moving to depart from the running lane and accordingly returning to the middle of the running lane can be mentioned. As a further condition designated as a condition in which the lane departure prevention function generates a warning, a condition in which the vehicle 12 cannot return to the middle of the running lane and the vehicle 12 is expected to depart from the running lane can also be mentioned.

Figure 12:
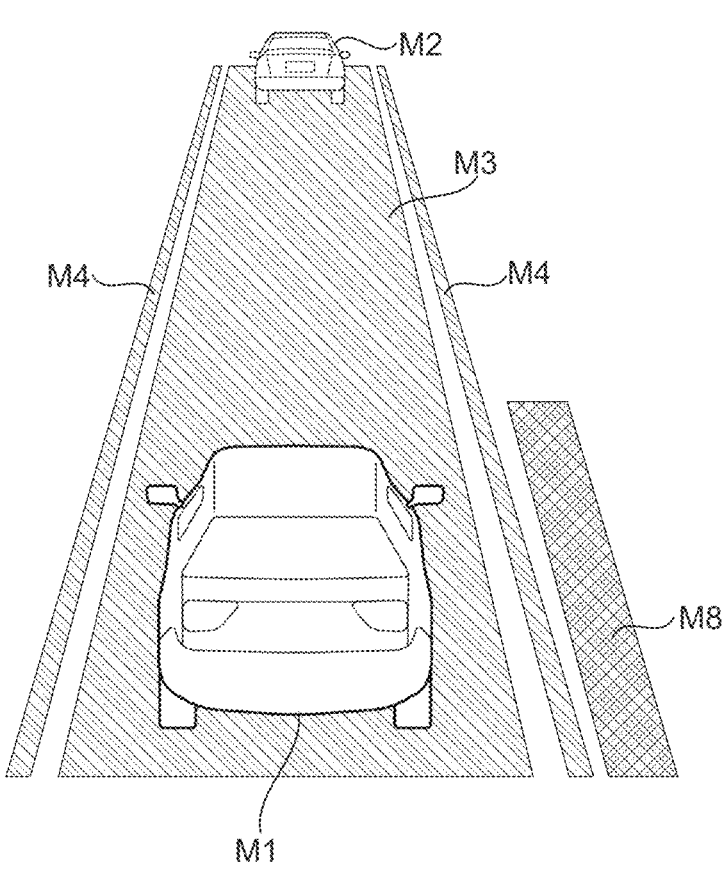
FIG. 12 is a view showing an example of a display screen according to a variant example.
Figure 13:
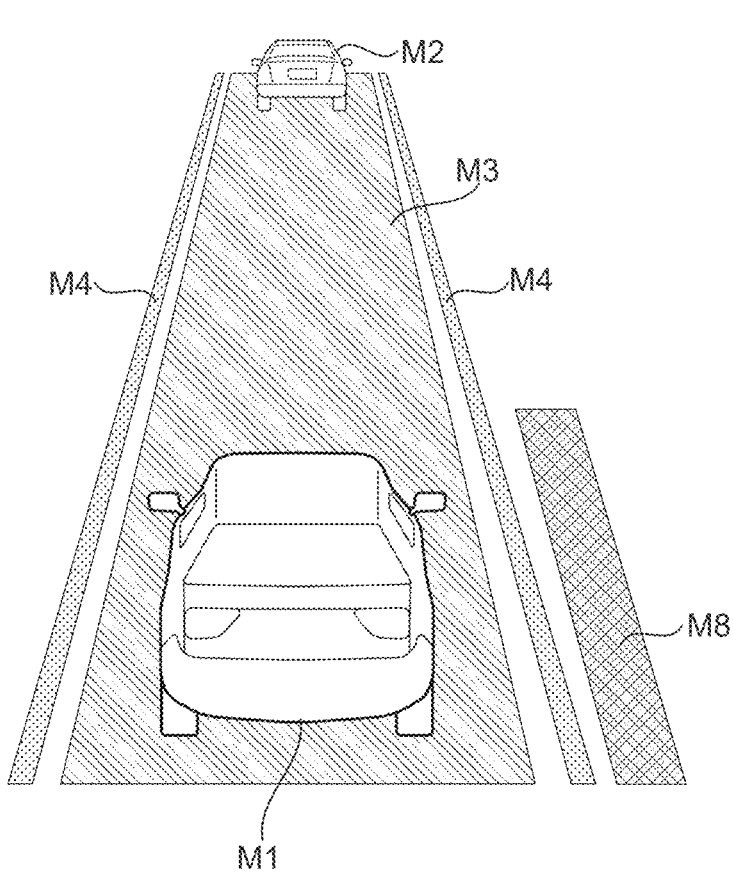
FIG. 13 is a view showing an example of a display screen according to the variant example.
Figure 14:
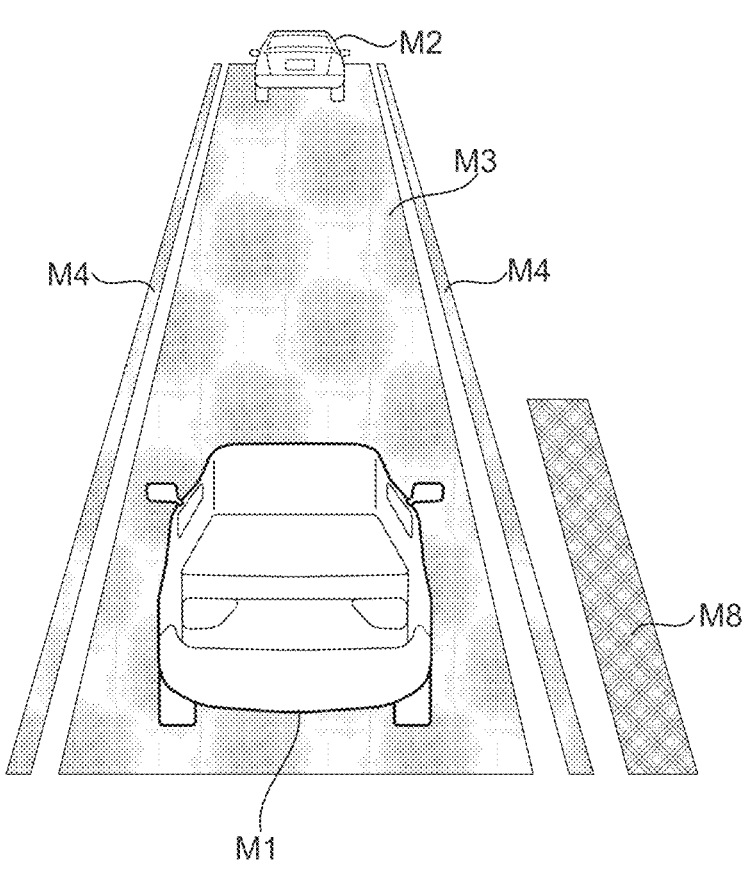
FIG. 14 is a view showing an example of a display screen according to the variant example.
Figure 15:
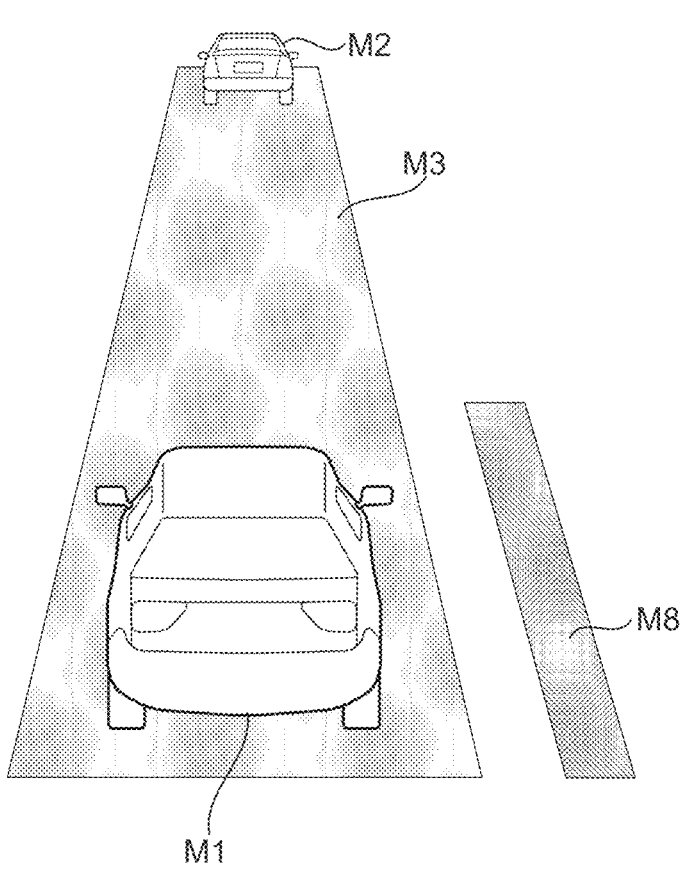
FIG. 15 is a view showing an example of a display screen according to the variant example.

FIG. 12 to FIG. 15 show examples of situations in which the vehicle 12 is moving to depart through the boundary line at the right side. FIG. 12 shows an example of a display screen when the vehicle following distance control function and the lane centering assist function are both in the first state and a condition designated as a condition for the lane departure prevention function to generate a warning is satisfied. FIG. 13 shows an example of a display screen when the vehicle following distance control function is in the first state, the lane centering assist function is in the second state and the condition designated as a condition for the lane departure prevention function to generate a warning is satisfied. FIG. 14 shows an example of a display screen when the vehicle following distance control function is in the off state, the lane centering assist function is in the second state and the condition designated as a condition for the lane departure prevention function to generate a warning is satisfied. FIG. 15 shows an example of a display screen when the vehicle following distance control function and the lane centering assist function are both in the off state and the condition designated as a condition for the lane departure prevention function to generate a warning is satisfied.

The processing that, in the exemplary embodiment described above, is executed by a CPU loading software (a program) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

The exemplary embodiments described above have configurations in which various kinds of data are memorized in ROM or storage, but this is not limiting. For example, a recording medium such as a CD (compact disc), DVD (digital versatile disc), USB (universal serial bus) memory or the like may be used as a memory section. In this case, various programs, data and the like are stored at this recording medium.

Hereabove, the vehicle 12 according to the exemplary embodiment is described, but it will be clear that numerous embodiments are possible within a scope not departing from the gist of the present disclosure.

What is claimed is:

1. A display control device for performing control to display states of a vicinity of a vehicle at a display device that is provided in a cabin of the vehicle and is viewable by a driver, the display control device comprising a processor configured to:

acquire, from an autonomous driving electronic control unit, an operation state of each of a plurality of driving assistance functions;

determine a display mode of a state of the vicinity of the vehicle including an image of a road surface and an image of a boundary line based on a change in the acquired operation state of each of the plurality of driving assistance functions such that the display mode changes in accordance with the change in the acquired operation states of each of the plurality of driving assistance functions; and change a display mode of the image of the road surface in accordance with an operation state of a first driving assistance function of the plurality of driving assistance functions, and change a display mode of the image of the boundary line in accordance with an operation state of a second driving assistance function of the plurality of driving assistance functions different from the first driving assistance function.

2. The display control device according to claim 1, wherein the state of the vicinity of the vehicle whose display mode is caused to change by the processor includes at least one of the image of the road surface of a traffic lane along which the vehicle is running and the image of the boundary line of the traffic lane.

3. The display control device according to claim 2, wherein the processor is further configured to cause the display mode of the image of the road surface to change in accordance with an operation state of a vehicle following distance control function that maintains an inter-vehicle distance between the vehicle and a preceding vehicle running in front of the vehicle.

4. The display control device according to claim 3, further comprising a sensor that is configured to detect an accelerator operation by an occupant of the vehicle, wherein the processor is further configured to change the display mode of the image of the road surface when an accelerator operation is detected by the sensor during operation of the vehicle following distance control function.

5. The display control device according to claim 2, wherein, when a condition designated as a condition causing a warning is satisfied, the processor is further configured to perform control to set a color of the image of the road surface to a specific color.

6. The display control device according to claim 2, wherein the display mode of the image of the boundary line is caused to change in accordance with an operation state of a lane centering assist function that assists the vehicle to run along a middle of the traffic lane.

7. The display control device according to claim 2, wherein a vehicle following distance control function maintains an inter-vehicle distance between the vehicle and a preceding vehicle running in front of the vehicle, a lane centering assist function assists the vehicle to run along a middle of a traffic lane and, when the vehicle following distance control function and the lane centering assist function are operating normally and a condition designated as a condition representing the vehicle being in traffic congestion is satisfied, the processor is further configured to change display modes of the image of the road surface and the image of the boundary line.

8. A display control method in which a computer performs control to display states of a vicinity of a vehicle at a display device that is provided in a cabin of the vehicle and is viewable by a driver, the display control method comprising:

acquiring, from an autonomous driving electronic control unit, an operation state of each of a plurality of driving assistance functions;

determining a display mode of a state of the vicinity of the vehicle including an image of a road surface and an image of a boundary line based on a change in the acquired operation state of each of the plurality of driving assistance functions such that the display mode changes in accordance with the change in the acquired operation states of each of the plurality of driving assistance functions; and changing a display mode of the image of the road surface in accordance with an operation state of a first driving assistance function of the plurality of driving assistance functions, and changing a display mode of the image of the boundary line in accordance with an operation state of a second driving assistance function of the plurality of driving assistance functions different from the first driving assistance function.

9. A non-transitory computer-readable storage medium storing a display control program for causing a computer that performs control to display states of a vicinity of a vehicle at a display device that is provided in a cabin of the vehicle and is viewable by a driver to:

acquire, from an autonomous driving electronic control unit, an operation state of each of a plurality of driving assistance functions;

determine a display mode of a state of the vicinity of the vehicle including an image of a road surface and an image of a boundary line based on a change in the acquired operation state of each of the plurality of driving assistance functions such that the display mode changes in accordance with the change in the acquired operation states of each of the plurality of driving assistance functions; and change a display mode of the image of the road surface in accordance with an operation state of a first driving assistance function of the plurality of driving assistance functions, and change a display mode of the image of the boundary line in accordance with an operation state of a second driving assistance function of the plurality of driving assistance functions different from the first driving assistance function.

10. The display control device according to claim 2, wherein the operation state includes an off state in which a driving assistance function is turned off by a button and on states in which the driving assistance function is turned on by a button, and the on states include at least one of (i) a first operation state in which the driving assistance function is operating normally, (ii) a second operation state in which the driving assistance function is not operating normally, and (iii) a third operation state in which the driving assistance function is operating normally but an alert is being given to an occupant of the vehicle.

11. The display control device according to claim 10, wherein the processor is further configured to perform control to recognize whether the operation state is the off state, the first operation state, the second operation state, or the third operation state, by changing display modes of the image of the road surface and images of boundary lines based on a change in the recognized operation state.

12. The display control device according to claim 1, wherein the plurality of driving assistance functions include two or more of a vehicle following distance control function that maintains an inter-vehicle distance between the vehicle and a preceding vehicle, a lane centering assist function that assists the vehicle to run along a middle of a traffic lane, and a traffic jam assist function that assists running of the vehicle under a traffic congestion condition.

13. The display control device according to claim 1, wherein the display mode of the state of the vicinity of the vehicle includes at least one of a color, a brightness, a pattern, a line type, or a thickness of a displayed image.

* * * * *